(12) United States Patent
Jin et al.

(10) Patent No.: US 11,270,054 B1
(45) Date of Patent: Mar. 8, 2022

(54) METHOD AND SYSTEM FOR CALCULATING PRINTED AREA METRIC INDICATIVE OF STOCHASTIC VARIATIONS OF THE LITHOGRAPHIC PROCESS

(71) Applicant: Siemens Industry Software Inc., Plano, TX (US)

(72) Inventors: Hyejin Jin, Palo Alto, CA (US); John L. Sturtevant, Portland, OR (US); Shumay D. Shang, Saratoga, CA (US); Azat Latypov, San Jose, CA (US); Germain Louis Fenger, Gladstone, OR (US); Gurdaman Khaira, Beaverton, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/008,109

(22) Filed: Aug. 31, 2020

(51) Int. Cl.
*G06F 30/392* (2020.01)
*G03F 7/20* (2006.01)
*G06F 111/08* (2020.01)
*G06F 111/10* (2020.01)

(52) U.S. Cl.
CPC ............ *G06F 30/392* (2020.01); *G03F 7/705* (2013.01); *G06F 2111/08* (2020.01); *G06F 2111/10* (2020.01)

(58) Field of Classification Search
CPC ............... G06F 30/392; G06F 2111/10; G06F 2111/08; G03F 7/705
See application file for complete search history.

(56) References Cited

U.S. PATENT DOCUMENTS

| | | | |
|---|---|---|---|
| 8,458,626 B1* | 6/2013 | Tirapu-Azpiroz | G03F 1/36 716/54 |
| 10,571,799 B1* | 2/2020 | Li | G03F 7/70441 |
| 2006/0240342 A1 | 10/2006 | Tang | |
| 2013/0191792 A1 | 7/2013 | Word | |
| 2015/0067628 A1 | 3/2015 | Torres Robles | |
| 2016/0292348 A1 | 10/2016 | Lei | |
| 2017/0184979 A1* | 6/2017 | Hsu | G03F 7/7085 |

(Continued)

OTHER PUBLICATIONS

Alan Genz. "Numerical computation of rectangular bivariate and trivariate normal and t probabilities." Statistics and Computing, vol. 14, issue 3, pp. 251-260, Aug. 2004.

*Primary Examiner* — Nha T Nguyen

(57) ABSTRACT

Systems and methods for calculating a printed area metric indicative of stochastic variations of the lithographic process are disclosed. Lithography is a process that uses light to transfer a geometric pattern from a photomask, based on a layout design, to a resist on a substrate. The lithographic process is subject to random stochastic phenomena, with the resulting stochastic randomness potentially becoming a major challenge. To characterize the stochastic phenomena, a printed area metric may be generated analytically (rather than via simulations) and comprise one or more defined moments for a printed area distribution associated with the printed area that are indicative of one or more aspects associated with printing. For example, the printed area metric may be indicative of the likelihood of printing within the printed area or the variance of printing within the printed area due to stochastic randomness in one or both of exposure or resist process.

21 Claims, 12 Drawing Sheets

(56) References Cited

U.S. PATENT DOCUMENTS

| | | |
|---|---|---|
| 2018/0275523 A1* | 9/2018 | Biafore .............. G05B 23/0254 |
| 2019/0102501 A1 | 4/2019 | Sturtevant |
| 2019/0266311 A1 | 8/2019 | Abouelseoud |
| 2020/0050099 A1* | 2/2020 | Su .......................... G06N 20/10 |
| 2020/0151600 A1* | 5/2020 | Huang ................... G06N 20/00 |
| 2020/0326632 A1* | 10/2020 | Fang ........................ G03F 1/36 |

* cited by examiner

METHOD AND SYSTEM FOR CALCULATING PRINTED AREA METRIC INDICATIVE OF STOCHASTIC VARIATIONS OF THE LITHOGRAPHIC PROCESS

FIELD

The present disclosure relates to the field of circuit design and manufacturing, and specifically relates to determining success or failure for a lithographic process due to stochastic variations of the lithographic process.

BACKGROUND

Electronic circuits, such as integrated microelectronics, are used in a variety of products, from automobiles to microwaves to personal computers. Designing and fabricating integrated circuits (IC) typically involves many steps, sometimes referred to as a "design flow." The particular steps of the design flow often are dependent upon the type of integrated circuit, its complexity, the design team, and the integrated circuit fabricator or foundry that will manufacture the IC. Typically, software and hardware "tools" verify the design at various stages of the design flow by running software simulators and/or hardware emulators. These steps aid in the discovery of errors in the design, and allow the designers and engineers to correct or otherwise improve the design.

For example, a layout design may be derived from an electronic circuit design. The layout design may comprise an IC layout, an IC mask layout, or a mask design. In particular, the layout design may be a representation of an integrated circuit in terms of planar geometric shapes that correspond to the patterns of metal, oxide, or semiconductor layers, which make up the components of the integrated circuit. The layout design can be one for a whole chip or a portion of a full-chip layout design.

Lithography is a process used to manufacture electronic circuits in which light is used to transfer a geometric pattern from a photomask, based on the layout design, to a silicon substrate by coated by a photo-sensitive resist material (photoresist). One common family of photoresists is composed of entangled polymer chains. The polymer contains certain functional groups which get modified due to chemical reactions caused by exposure to light (deprotection) and hence affects the polymer's solubility during development and thus creating a mask for the subsequent etching process. Various types of lithography processes are used, including deep ultraviolet (DUV) lithography or extreme ultraviolet (EUV) lithography. In DUV or EUV lithography, one or more stochastic phenomena may manifest themselves, such as line edge roughness or critical dimension (CD) non-uniformity. In more extreme cases, the stochastic phenomena may lead to stochastic pinching or bridging of the patterned features, resulting in potential failure of the electronic circuit.

DUV lithography or EUV lithography may be subject to random stochastic phenomenon based on any one, any combination or all of: (1) photon shot noise; (2) stochastic phenomena in the resist process (e.g., photo-acid generator's (PAG) activation, acids/quencher molecules random walk and reactions, deprotection of the functional groups); or (3) stochastic phenomena in the resist development (e.g., dissolution of entangled partially deprotected polymer chains). While stochastic randomness effects both DUV and EUV lithography, the effects are more severe for EUV lithography due to lower average photon counts, resulting in stochastic randomness being one of the major challenges in EUV lithography.

Stochastic randomness may affect various parts of the layout design, such as features in the layout design intended to be printed and features in the layout design not intended to be printed. Merely by way of example, sub-resolution assist features (SRAFs) and main features may be included in the layout design. SRAFs are the auxiliary features (e.g., dark or bright areas on the photomask) added typically in the vicinity of the main features. The main features are intended to print the element of the integrated circuit on the wafer, usually shaped similarly to the main feature (e.g. a via or a contact hole or an interconnect wire). The SRAFs are designed so that they do not print themselves on the wafer, but help to make the printed main features to be closer to the target shapes and to be less sensitive to the perturbations of the lithographic process parameters (e.g. dose and focus). Examples of SRAFs are disclosed in US Patent Application Publication No. 2006/0240342 A1, US Patent Application Publication No. 2013/0191792 A1, and US Patent Application Publication No. 2019/0266311 A1, each of which are incorporated by reference in their entirety.

Deviations of the lithographic process parameters from their nominal values, such as due to the stochastic perturbation phenomena described in the previous section, may result in SRAF features printing themselves (e.g., sidelobe printing). As a result, unintended printed features may occur on the wafer, resulting in lithographic defects and reducing the yield of the lithographic process of the integrated circuit fabrication. Thus, methodologies seek to determine the likelihood of SRAF printability.

Various methods seek to understand stochastic randomness in order to determine the likelihood of SRAF printability. As one example, experimental measurements are used whereby multiple instances of the pattern of interest are exposed and measured, with identical exposure, development and measurement settings. In particular, multiple instances of the pattern of interest are exposed and their scanning electronic microscope (SEM) images are measured, with identical exposure, development and SEM measurement settings. The SEM measurements results are analyzed to assess the frequency of the SRAF or sidelobe printing in these multiple experimental trials.

As another example, Monte Carlo simulations are performed using stochastic rigorous models of exposure and resist processes. Specifically, multiple simulation runs (e.g., simulation trials) are run with identical exposure, development and simulated metrology settings, differing by the random seed factors used in the stochastic simulator. The outcomes of these random simulation trials are then analyzed to assess the frequency of the SRAF or sidelobe printing in these multiple experimental trials.

As still another example, non-stochastic resist and exposure models may be used with modifications increasing the printability of sidelobes. In particular, for a positive resist, the value of the threshold may be lowered, or the nominal dose can be slightly increased, to cause SRAFs or sidelobe printability. The simulated printed SRAFs or sidelobes are then measured and the likelihood of their printability from stochastic perturbations is judged by the dimensions of the simulated printed SRAFs or sidelobes.

As yet another example, the probability of SRAF or sidelobe printing may be calculated in a certain area. In particular, the calculation may be performed using the stochastic model and the methods described in U.S. application Ser. No. 16/545,601, entitled "Method and System for Calculating Probability of Success or Failure for a Lithographic Process Due to Stochastic Variations of the Lithographic Process", incorporated by reference herein in its entirety.

SUMMARY

To be completed after finalizing the claims

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

General Considerations

Figure 1:
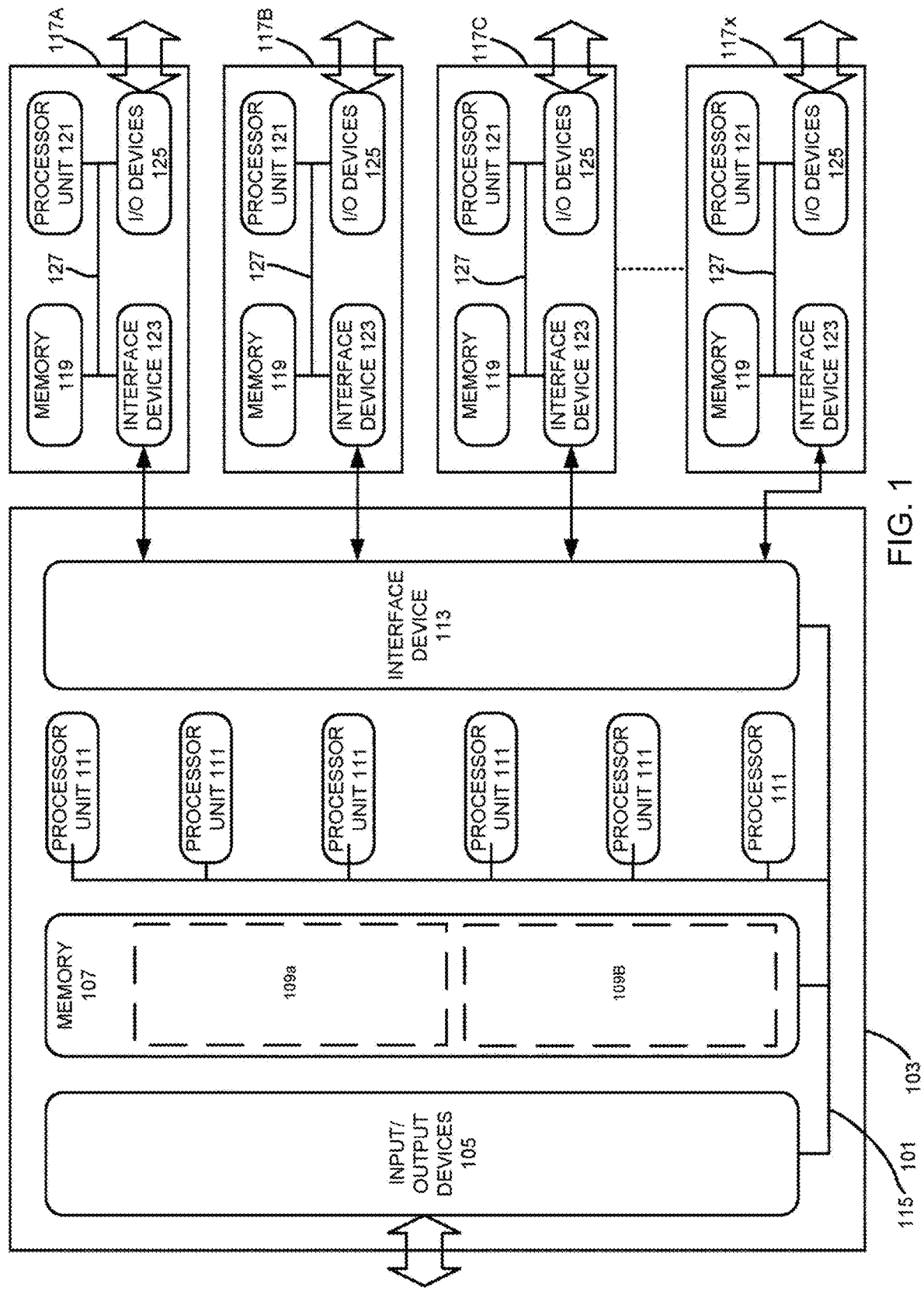
FIG. 1 illustrates an example of a computing system that may be used to implement various embodiments of the disclosed technology.

Various aspects of the present disclosed technology relate to techniques for determining one or more printed area metrics indicative of stochastic randomness in the exposure and resist process in order to improve (or optimize) illumination and/or mask used in a semiconductor manufacturing process, thereby reducing the effects of stochastic randomness on the yield of the lithographic process. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on one or more non-transitory machine-readable media, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "generate," "access," and "determine" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input/output devices 105 and a memory 107. The input/output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of machine readable media, such as computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations, such as the operations disclosed herein. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
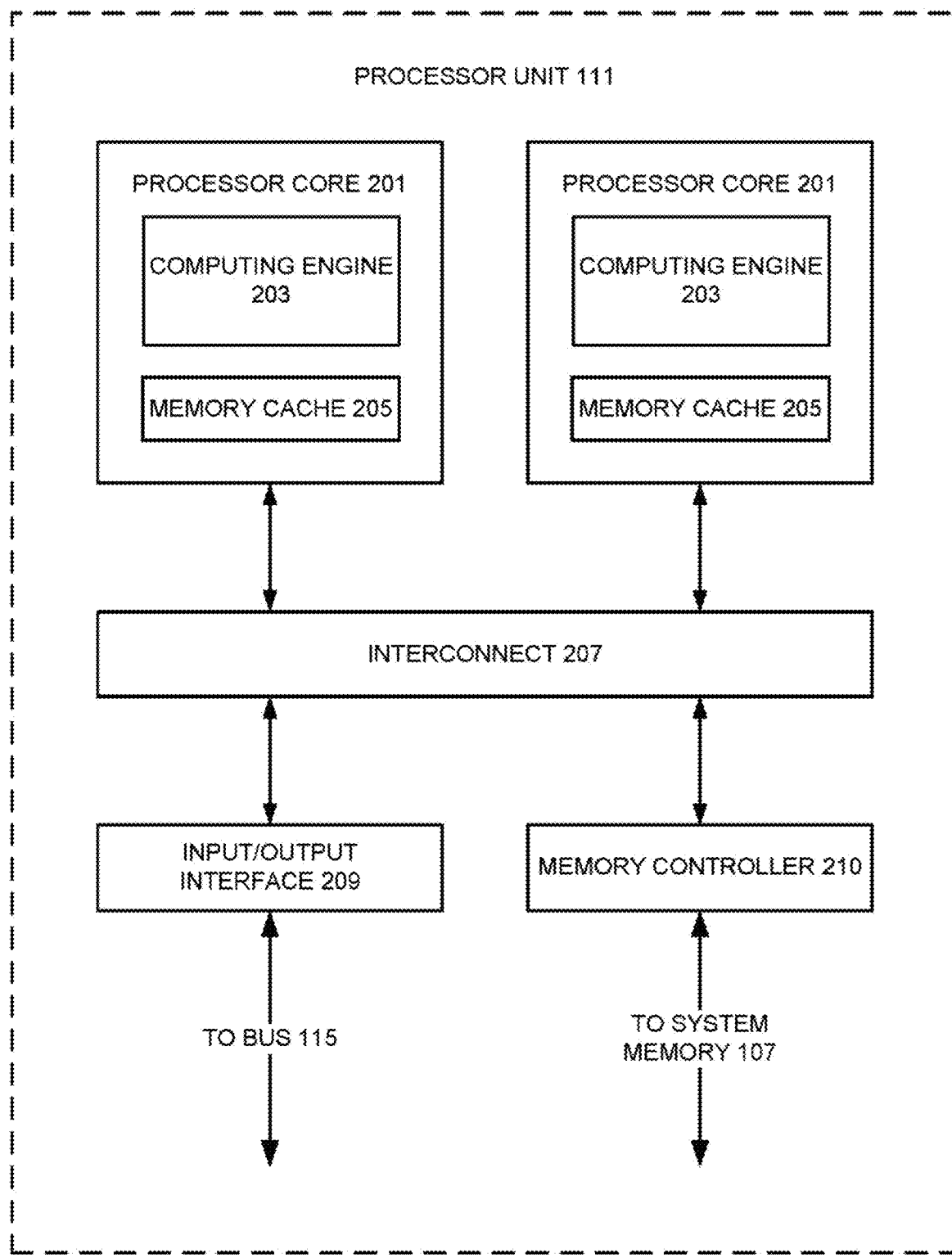
FIG. 2 illustrates an example of a multi-core processor unit that may be used to implement various embodiments of the disclosed technology.

With some implementations of the disclosed technology, the master computer 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Stochastic Phenomena

Lithography may comprise patterning layers for semiconductor dies. As discussed above, random stochastic phenomena may affect lithography, particularly EUV lithography, resulting in defects in the semiconductor dies. As discussed in the background, one solution is to analyze SEM measurements results to assess the frequency of the SRAF or sidelobe printing in multiple experimental trials. However, the experimental measurements of multiple repeated identical exposures are practical only for a small subset of patterns of the integrated circuit layer.

Another solution to determine the effect of the random stochastic phenomena is to perform Monte Carlo simulations. In particular, potentially millions of different Monte Carlo simulations, with random seeds encoding the locations where the individual photons are absorbed in the resist film, may be run. The random seeds serve as starting points for random number generators to simulate small random variations. Millions of the simulations, which are performed for a large portion of the layer (and not merely for the critical portions), result in success or failure, thereby generating a distribution of success or failure. This procedure to perform millions of simulations is very computationally expensive. Thus, due to the computationally expensive nature, Monte Carlo simulation simulations and analysis of multiple repeated identical exposures are practical likewise only for a small subset of patterns of the integrated circuit layer.

Still another solution is using non-stochastic resist and exposure models with modification increasing the printability of sidelobes. However, the drawback of such a methodology is that the known modification increasing the printability of sidelobes may not always accurately represent stochastic perturbations of exposure and resist processes.

In contrast, in some embodiments, rather than running Monte Carlo simulations or the like, a printed area metric based on an analytical solution (rather than a simulated solution) is generated. The analytical printed area metric comprises one or more defined moments for a printed area distribution associated with the printed area that are indicative of one or more aspects associated with printing (e.g., the likelihood of printing within the printed area; variance of printing within the printed area; skewness of the printed area; kurtosis of the printed area; etc.) due to stochastic randomness in one or both of exposure or resist process. In particular, the printed area may be considered the random variable from a stochastic standpoint. As such, different moments may be calculated for the printed area distribution associated with the printed area.

Various ways are contemplated to calculate the moments for the printed area distribution. As discussed in more detail below, the moments for the printed area distribution may be calculated without direct knowledge of the printed area distribution. In one or some embodiments, a distribution (such as cumulative distribution function (CDF)) associated with deprotection of resist for the printed area may be used to calculate the moments for the printed area distribution. In this way, knowledge of the distribution associated with deprotection enable the calculation of the moments for the printed area distribution without the need for deriving the CDF for the printed area distribution. As discussed further below, the first moment (e.g., the first raw moment) and the second moment (e.g., the second central moment) may be calculated. Higher order moments, such as the third moment (skewness), fourth moment (kurtosis), and other higher moments, are contemplated as well (e.g., in a calculation of the expected value of the resistance of a via, assuming that the resistance of the via satisfies the Pouillet's law where resistance is proportional to the via material resistivity and the length of the via and is inversely proportional its cross-section area). Alternatively, the moments may be calculated directly from the printed area distribution.

As one example, a first moment, indicative of the average/mean/expectation, may be calculated for the printed area distribution associated with the printed area. As discussed in more detail below, the CDF associated with deprotection of resist for the printed area may be used to determine an average printed area (APA). As another example, a second moment, indicative of the standard deviation/variance, may be calculated for the printed area distribution associated with the printed area. As discussed in more detail below, the CDF associated with deprotection of resist for the printed area may be used to determine the standard deviation (e.g., the square root of the variance (sqrt(Var(A)), where A is the defined printed area)). In this way, different moments, such as the first statistical moment of the random variable (e.g., indicative of the average), the second statistical moment of the random variable (e.g., indicative of the variance), or other moments of the random variable, may be calculated.

For example, APA may comprise a statistical expectation of the defined printed area. APA may be more lithographically meaningful than merely a probability of printing because APA, in effect, assigns higher "weights" to larger printed areas. Further, APA may be analytically calculated by integrating over a defined area (such as the sidelobe printability control domain (SPCD)) for a deprotection function (e.g., using a CDF, such as a Gaussian Random Field deprotection function), as discussed in more detail below. In this way, APA may use the CDF, sampling random deprotection at various points within the defined area, so that the CDF is of a univariate random vector.

As another example, the standard deviation may comprise a probative stochastic metric to characterize the stochastic-caused variation of lithographically patterned elements, such as vias/contact holes. Similar to the APA metric, the standard deviation of the printed area may be analytically calculated (e.g., using a CDF, such as Gaussian Random Field deprotection function). As discussed further below, the standard deviation may use the CDF of the bivariate random vector, with a first component deprotection at point $x_1$ and a the second component deprotection at point $x_2$.

The one or more moments may be probative stochastic metrics for different aspects of the layout design. In particular, in one or some embodiments, the one or more moments may be probative as to the printability of one or more elements in the layout design (such as one or more elements in the layout design that are not designated for printing). As one example, SRAFs are for assisting in the printing of other elements (e.g., main features) but are not to be printed themselves. As such, printing of SRAFs is rare, random, and may be caused by stochastic phenomena. As another example, pinching or bridging between two or more lithographic features (e.g., between the tips of two trenches) may likewise be caused by stochastic phenomena. The first moment of the printed area distribution, such as APA, which is indicative of the average printed area, may be probative of the likelihood of printing for element(s) not designated for printing.

Alternatively, or in addition, the one or more moments may be probative as to one aspect of printability (e.g., variability associated with printing) of one or more elements in the layout design that are designated for printing. As one example, vias/contact holes (CH) may be considered main features for printing. Stochastic phenomena may affect the printing of those main features, such as the variability of those printed main features. As such, one or more printed area metrics, such as standard deviation (or other metric derived from variance) of the printed area, may be probative of the variability of printing of main features designated for printing. In this way, the second moment of the printed area distribution may be a better metric for assessing the printing of the main features.

Alternatively, multiple moments, such as the first moment and the second moment, may be used in combination. In one or some embodiments, responsive to identifying a non-linear function associated with a physical meaningful quantity, multiple moments may be used. For example, calculating a metric indicative of the expectation of resistance (such as in the context of a via, which is discussed further below and may be based on a non-linear function), the formulation may use a Taylor expansion as a linear combination of a first moment of the expectation of the printed area and a second moment of the variance of the printed area.

Thus, the analytical printed area metric may be indicative of the likelihood of whether, within a respective printed area, any one, any combination, or all of the following may occur: SRAF printing; pinching or bridging; the lithographic process results in the complete removal of the resist material; the lithographic process results in the complete retention of the resist material; variance of main feature printing; or the like.

The analytical printed area metric may thus be indicative of the success or failure of critical sections of the layout design identified as particularly susceptible to failure. In this way, the analytical printed area metric may: (i) provide a computationally efficient way to calculate the printed area metric indicative of the outcome of the lithographic process with respect to the stochastic randomness in exposure and the resist process; and/or (ii) enable the improvement (or optimization) of the illumination (e.g., source) and/or the mask (e.g., with regard to source-mask optimization (SMO) or optical proximity correction (OPC) algorithms) in order to reduce or mitigate the effects of stochastic randomness on the yield of the lithographic process. Examples of lithographic processes are disclosed in US Patent Application Publication No. 2015/0067628 A1 and US Patent Application Publication No. 2019/0102501 A1, both of which are incorporated by reference in their entirety.

Specifically, the analytical printed area metric may efficiently identify certain critical sections prone to failure (based on the determined printed area metrics, such as printability and/or variability of printing) in order to modify one or both of the intensity (or other light exposure parameter) or the resist (such as the pattern in the layout design) to reduce the possibility of failure. In this way, the methodology makes it practical to calculate the printed area metric without multiple iterations of the SMO, OPC or verification algorithms for the entire die of the integrated circuit. This is unlike typical analysis methodologies, such as based on Monte Carlo simulations, that make the use of experimental exposures and measurements in multiple iterations of the mask preparation flow impractical. Rather, the analytical printed area metric for one or more defined printed areas may be calculated within a reasonable time, with results comparable to Monte Carlo simulations, allowing quick verification of the OPC/SMO solutions and to calculate the OPC/SMO solutions, thereby reducing the probability of stochastic failure and improving the yield, particularly in the EUV lithography.

In one implementation of OPC, the mask pattern is modified (such as iteratively modified) in order to produce the mask pattern yielding the optimal process result with regard to a certain criterion (e.g., the least edge placement error or the least failure probability). An example of OPC is disclosed in US Patent Application Publication No. 2016/0292348, incorporated by reference herein in its entirety.

In one implementation, in SMO, the mask pattern, illumination mode and potentially exposure dose are modified (such as iteratively modified) to produce the optimal process result (e.g., the least edge placement error or the least failure probability). An example of SMO is disclosed in US Patent Application Publication No. 2015/0067628, incorporated by reference herein in its entirety.

Figure 3:
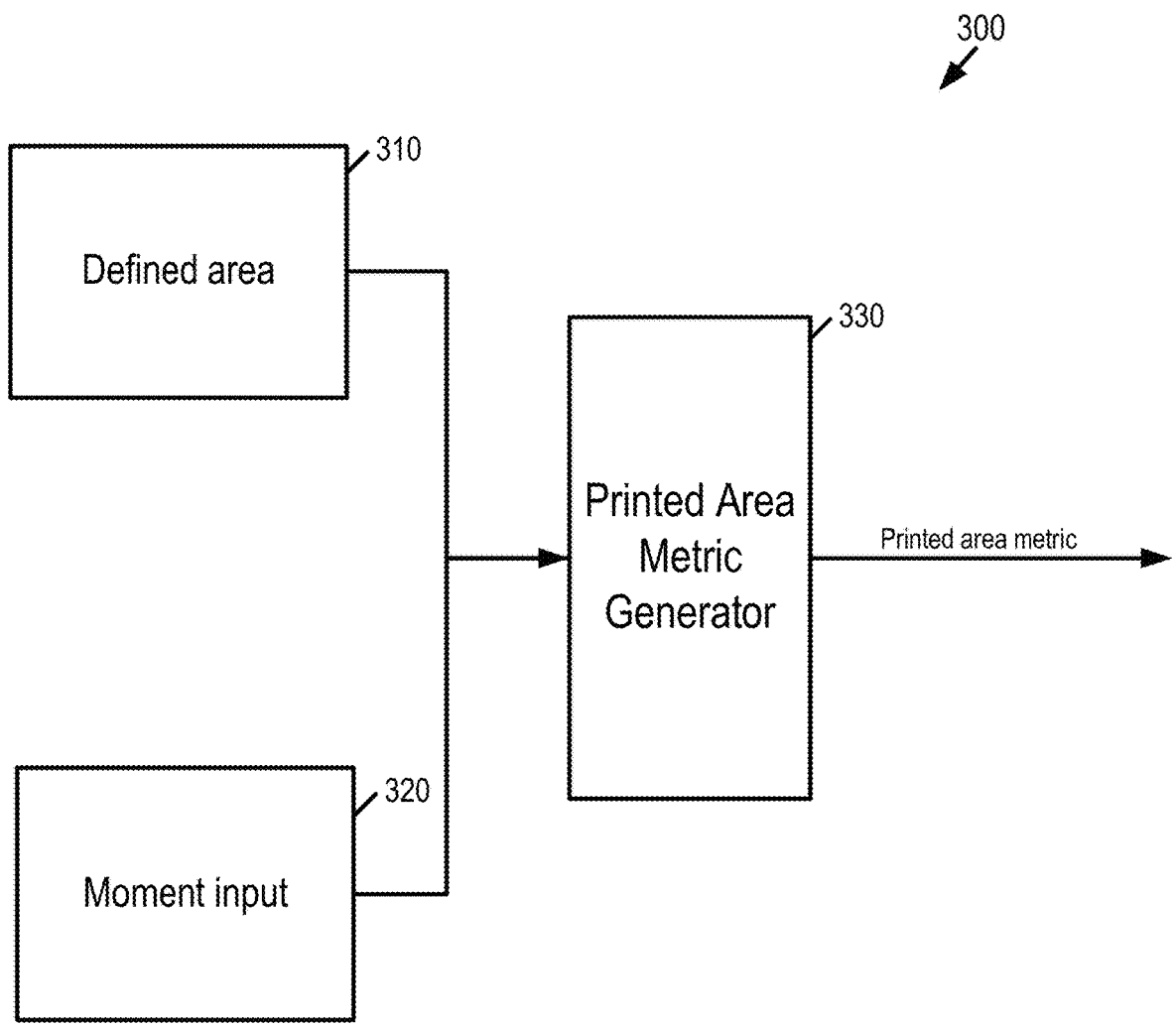
FIG. 3 illustrates a block diagram of inputs to and output(s) from a printed area metric generator.

Referring back to the figures, FIG. 3 illustrates a block diagram 300 of inputs to and output(s) from a printed area metric generator 330. As discussed above, the printed area metric may be dependent on one or more factors, such as the defined area and/or the desired moment. In this regard, the printed area metric generator 330 may receive one or more inputs, including any one, any combination or all of: the defined are 310 (e.g., SPCD) and the moment input (e.g., input indicative that the first moment printed area metric is sought, etc.). Further, the output of the printed area metric generator 330 may comprise printed area metric (e.g., the first moment of the printed area metric (e.g., APA), the second moment of the printed area metric (e.g., standard deviation)).

Figure 4:
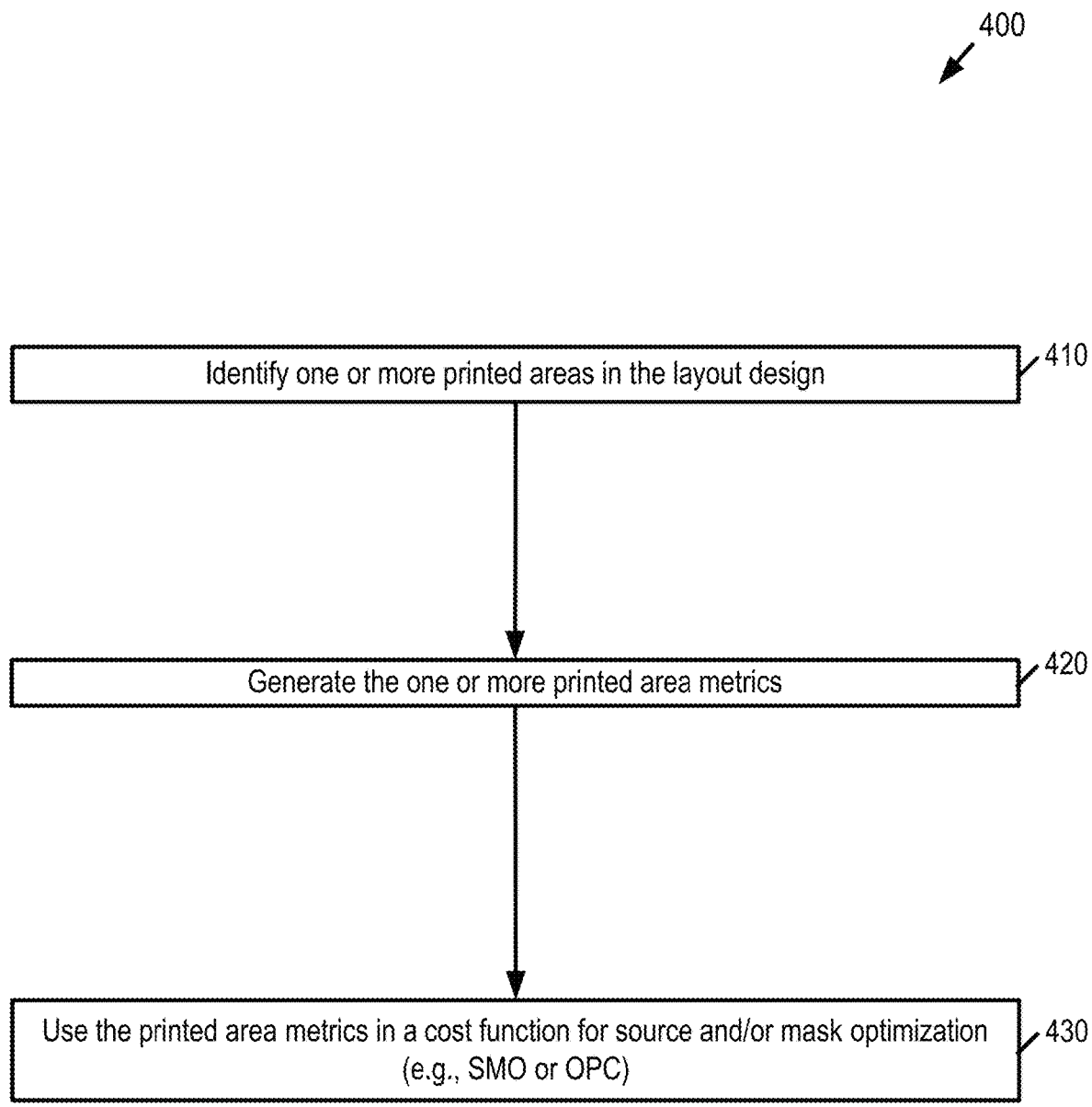
FIG. 4 is a flow diagram of generating and using the printed area metric generator.

FIG. 4 is a flow diagram 400 of generating and using the printed area metric generator. At 410, one or more printed areas of the layout design may be identified. At 420, the one or more printed area metrics are generated.

At 420, the generated printed area metric(s) may be used in a cost function for one or both of source optimization or mask optimization. In optimizing the lithographic process, a cost function may be used. The cost function may take one of several forms suitable for the goal of optimization and represent one or more figures of merit (e.g., a metric of the system). An example of cost function analysis is disclosed in US Patent Application Publication No. 2015/0067628, incorporated by reference herein in its entirety. The optimization process may find one or more parameters of the system that optimizes (e.g., minimizes or maximizes) the cost function, under a certain constraint if any. When the cost function is optimized (e.g., minimized or maximized), the one or more figures of merit represented by the cost function are optimized (e.g., minimized or maximized). In a lithography apparatus, an example of a cost function comprises:

$$\text{Cost} = F*D \tag{1}$$

where F equals the frequency of the pattern and D equals the printing difficulty factor. In some implementations, the generated printed area metric(s) may be factored into the cost function, such as incorporated into D.

Figure 5:
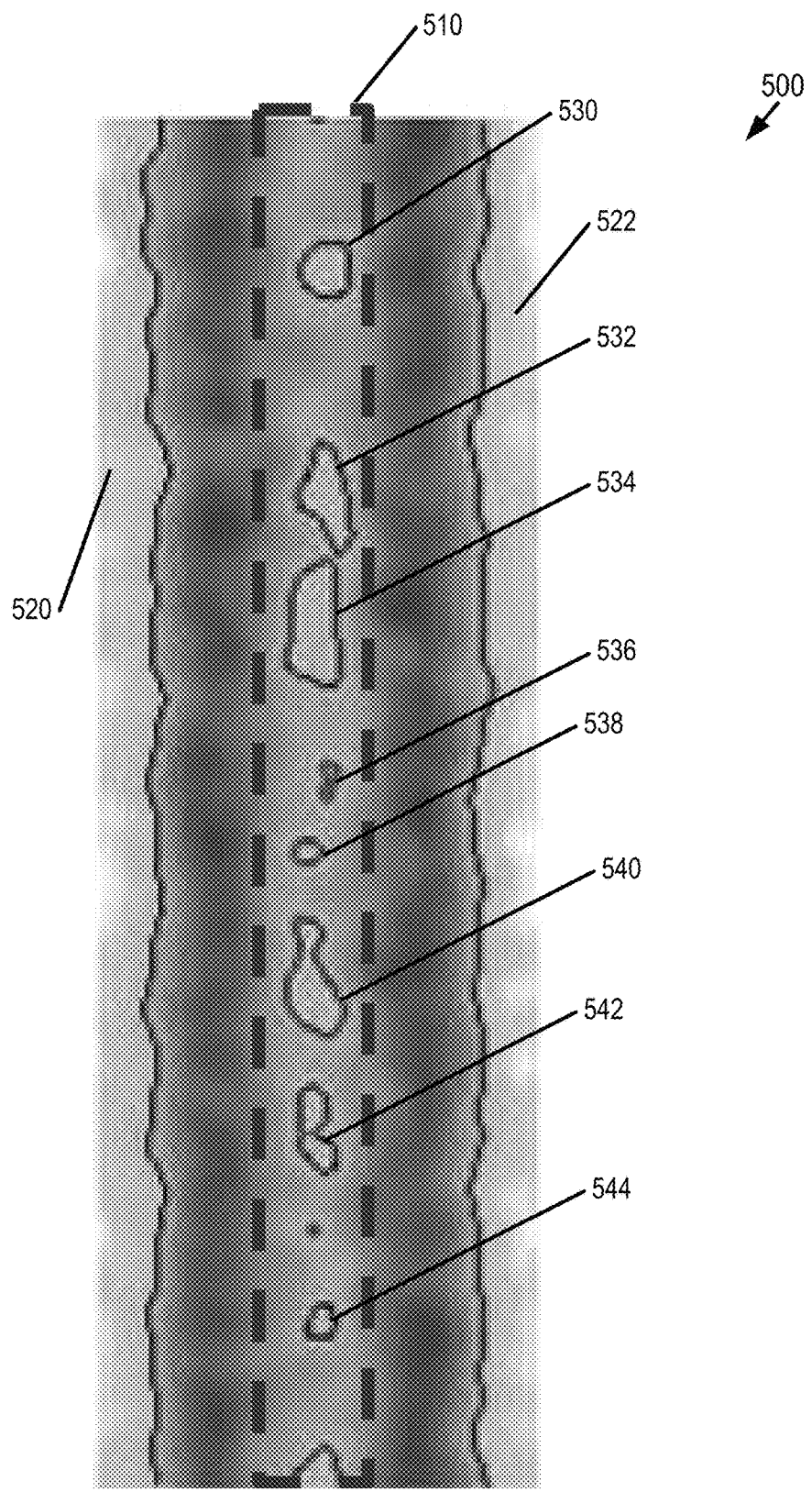
FIG. 5 is an illustration of a sidelobe printing control domain (SPCD).

FIG. 5 is an illustration 500 of a sidelobe printing control domain (SPCD) 510. As discussed above, the printed area may be defined in order to generate the printed area metric associated thereto. With regards to FIG. 5, the printed area is defined as the area associated with SRAFs, as shown by box 510 in between lines 520, 522 in which elements, such as 530, 532, 534, 536, 538, 540, 542, 544 associated with SRAFs, are printed due to stochastic phenomena.

As discussed above, APA comprises the statistical expectation (e.g., average) of the area of the printed features (e.g. the area of the printed SRAFs shown by 530, 532, 534, 536, 538, 540, 542, 544) within a user-defined area, such as the SPCD 510 illustrated in FIG. 5. APA may thus be thought of as a printed area averaged over infinitely many trials. Further, APA may be estimated by running a sufficiently large number of Monte Carlo trials and averaging the printed areas, as discussed above. In contrast, the analytically-determined APA metric may be calculated efficiently without running multiple simulations.

In one or some embodiments, the APA for the printed area distribution may be calculated based on the CDF of the deprotection function. As one example, the mathematical derivation may be as follows:

$$APA = E(\int_{SPCD} H(n(x)-t)dx) \tag{2}$$

$$APA = \int_{SPCD} E(H(n(x)-t))dx \tag{3}$$

$$APA = \int_{SPCD} (1 - F_{n(x)}(t))dx \tag{4}$$

where E(.) is the statistical operator of expectation (i.e., average), H(.) is a Heaviside function (i.e., H(x)=1, x≥0, H(x)=0, x<0), n(x) is a deprotection function, t is a threshold of the resist model, $F_{n(x)}(.)$ is a cumulative distribution function (CDF) of a scalar random variable n(x). Thus, where n(x)>t, the resist is removed. In this way, the Heaviside function may be used to correlate that for all areas where n(x)>t, the value of the Heaviside function=1. As shown, the integration is over the defined area, in this instance SPCD. Other defined areas are contemplated.

Various distributions of scalar random variable n(x) are contemplated. As one example, for one example of the stochastic model, n(x) may comprise a Gaussian Random Field. As such, equation (4) results in:

$$APA = \frac{1}{2} \int_{SPCD} \left(1 - erf\left(\frac{t - \mu(x)}{\sigma(x)\sqrt{2}}\right)\right) dx \tag{5}$$

where erf(.) is the Gauss error function, μ(x) is the mean deprotection, which may be calculated from the advanced resist model (e.g., the non-stochastic OPC resist model) or the stochastic model, σ(x) is a standard deviation (e.g., square root of the variance) of a random variable n(x) (i.e. the Gaussian Random Field sampled at the point x), which may be calculated from the stochastic model. Though n(x) is considered a Gaussian Random Field, other distributions, such as a continuous random field distribution, a multivariate normal distribution, or the like, are contemplated as well.

Further, the standard deviation (e.g., the sqrt(Var(A)), where A is the printed area) may be indicative of variation of the area of the printed features, which may be a probative stochastic metric characterizing the stochastic variability of certain features. The standard deviation printed area metric may be used alone or in combination with other metrics, such as any one, any combination, or all of: local critical dimension uniformity (LCDU); line width roughness (LWR) (e.g., measuring the distance between the edges of a line and calculating 3 times the standard deviation); or line edge roughness (LER) (e.g., measuring 3 times the standard deviation of the position of 1 edge).

The standard deviation printed area metric may be probative for the stochastic variability of various features that are designated for printing, such as via/CH patterns. For example, in the case of via/CH patterns, the standard deviation printed area metric may be probative because the electrical resistance of the wire is inversely proportional to the area of its cross-section (and not its critical dimension (CD) or any other linear measurement of its width used in other metrics). Thus, the standard deviation printed area metric is a probative lithographical metric to the cross-sectional area of the via. Further, the area of the SEM-imaged via on the wafer is easy to calculate from the contour of the SEM image. Compared to the calculation of CD from the SEM image, the calculation of such area does not require aligning the CD gauge to the (unknown) center of the target of the via. Finally, the standard deviation printed area metric may be efficiently analytically calculated, as shown below.

For Var(A), where A is the printed area:

$$\text{Var}(A) = E(A^2) - (E(A))^2 \tag{6}$$

For the first term in Equation (6):

$$E(A^2) = E((\int_V H(n(x)-t)dx)^2) \tag{7}$$

$$E(A^2) = E(\iint_{VV} H(n(x_1)-t)H(n(x_2)-t)dx_1 dx_2) \tag{8}$$

$$E(A^2) = \iint_{VV} E(H(n(x_1)-t)H(n(x_2)-t))dx_1 dx_2 \tag{9}$$

$$E(A^2) = \iint_{VV} (1 - F_{(n(x_1),n(x_2))}(t,t))dx_1 dx_2 \tag{10}$$

where V is the simulation area, n(x) is deprotection (resist image), t is a printability threshold and H is a Heaviside function (H (x)=1, when x≥0, and (H(x)=0 otherwise).

$F_{(n(x_1),n(x_2))}(t, t)$ denotes a CDF of a bivariate random variable $(n(x_1), n(x_2))$, where this CDF is evaluated at a point $(t, t)$.

The second term in Equation (6), $(E(A))^2$, is the squared APA, calculated within the simulation domain V, for example, as described above, with SPCD integration area replaced by the simulation domain V.

In this regard, there is a random printed domain, or printed feature, with the area of this random domain/feature (A), being a random variable. V is a deterministic simulation domain, which may be user-selected, within which the user may seek to characterize a stochastic variation of a printed feature, such as a via. The user may thus select V to encompass the variations of the printed element (e.g., variations in the vias) that the user considers possible.

For instance, certain printed elements, such as vias, may be placed in periodic patterns. For these periodic via patterns, the adjacent vias may be placed sufficiently far as not to merge as a result of their stochastic fluctuations. All stochastic fluctuations of each via of interest to the user may then be bound to the period of the given via, with V selected to be this period. For the formula for Var(A) to represent the variance of a given via, the simulation domain may be selected such that for any possible stochastic perturbation of the given via, V includes this given via entirely, and V need not include any portion of any other neighboring vias. In other words, the formula for Var(A) may comprise a formula for the variance of the printed area within the user-selected domain V. If Var(A) is sought to represent the variance of a given via, the selected V may include this given via in all of its entirety, and need not include any other neighboring vias, for any stochastic fluctuations these vias may experience.

In the example of a sufficiently sparse rectangular arrays of vias where the vias are separated center-to-center in the x and y directions in Px and Py, one manner to select V (the simulation domain) for a respective via is to select V based on the dimensions of the array (e.g., select V to be an Px-by-Py rectangle centered on the respective via). In this way, the rectangular domain may be called a period of this via array.

For the current stochastic model (which may be based on the Gaussian Random Field deprotection (n(x))), an analytical calculation of the standard deviation of the printed area metric may be performed by calculating the CDF of the bivariate normal distribution $(n(x_1), n(x_2))$ at a point $(t, t)$. The CDF of a bivariate normal distribution can be efficiently calculated by a numerical integration of the probability density function (PDF) of a bivariate normal distribution, see, e.g., Genz, A. Numerical computation of rectangular bivariate and trivariate normal and t probabilities. *Statistics and Computing* 14, 251-260 (2004).

Figure 6:
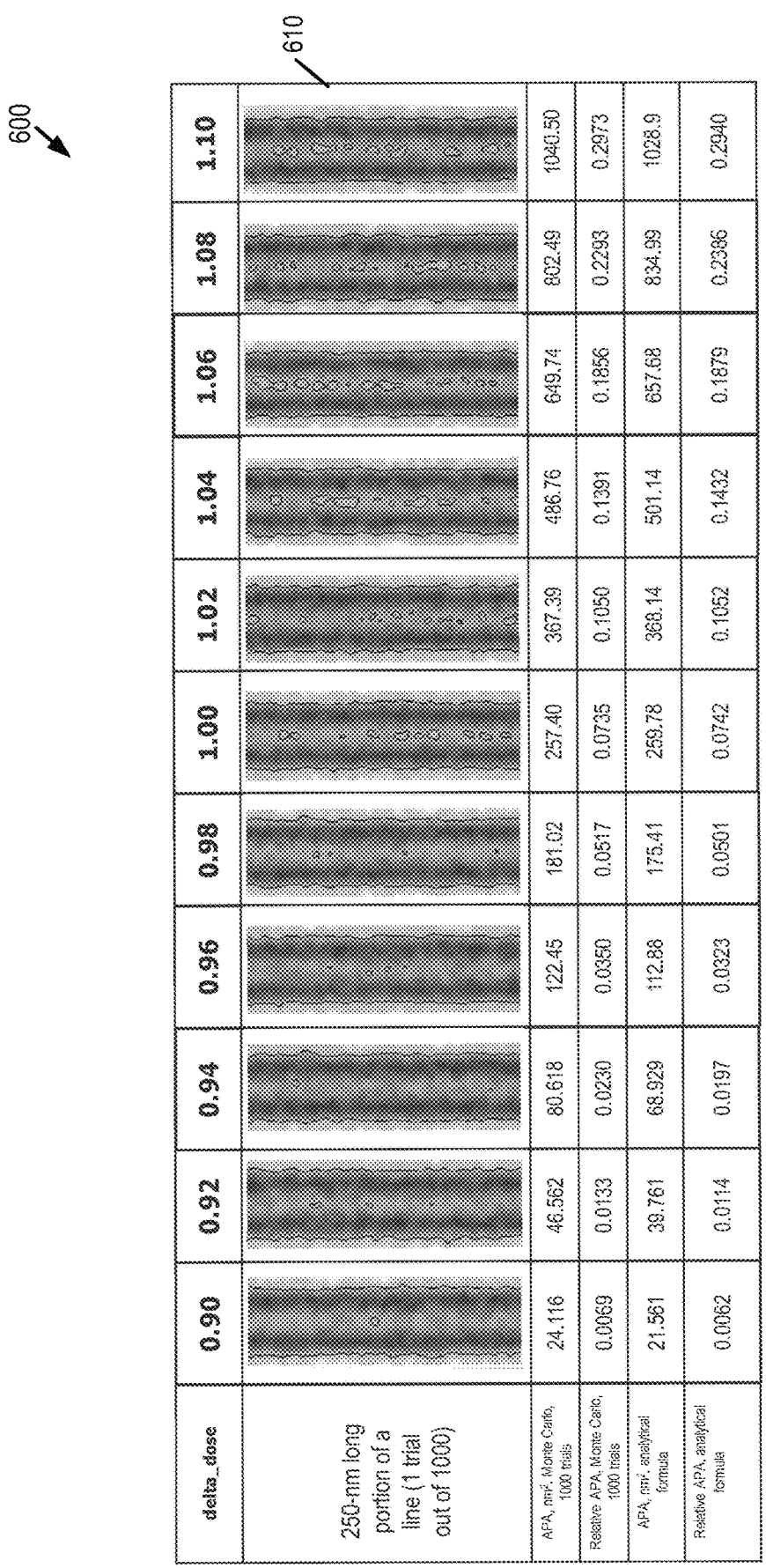
FIG. 6 is a table of SRAF-relative APA vs. dose derived from Monte Carlo simulations and from the analytical formula for the illustration in FIG. 5.

The analytical APA metric may be compared with the Monte Carlo simulation-based APA metric for a lines and spaces (LS) SRAF case. In particular, the table 600 (with images of the SPCD 610 for different doses) illustrated in FIG. 6 includes results for an EUV process for an LS array with pitch=80 nm, main feature linewidth=20 nm, the SRAF linewidth of 14 nm, dose=100 mJ/cm2, diffusion_length=3 nm, resist_efficiency=0.05, which results in APA relative to the design SRAF area of about 0.07-0.08. As shown in FIG. 6, the dose is varied within −10% to +10% from the nominal, and APA relative to the design SRAF area is calculated, first using Monte Carlo simulations and second using the analytical formula for APA. Thus, as shown in the table 600, the APA in nm$^2$ for the Monte Carlo simulations is based on 1,000 trials. The relative APA, both for the Monte Carlo simulations and the analytical APA, are derived based on dividing the APA by the area of 3,500 nm$^2$ (in the present case, the SPCD is 14 nm*250 nm=3,500 nm$^2$ centered rectangle, with the mask SRAF within 250 nm long line). It is noted that the agreement between the APA based on the Monte Carlo simulations and the analytical APA may be further improved by increasing the number of Monte Carlo trials.

Figure 7A:
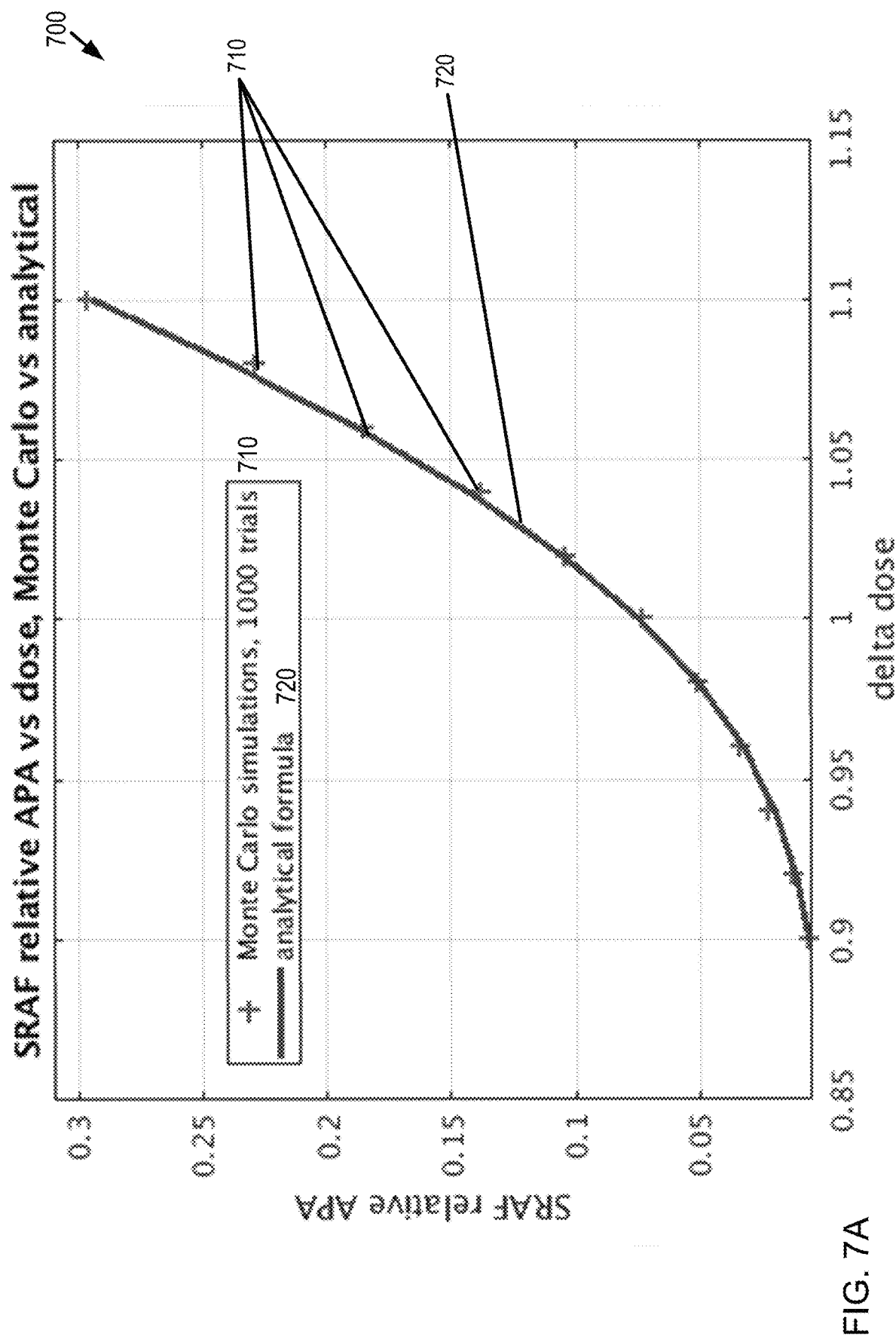
FIG. 7A is a graph of SRAF relative APA vs. dose for Monte Carlo and for analytical solutions (linear scale) for the data illustrated in FIG. 6.
Figure 7B:
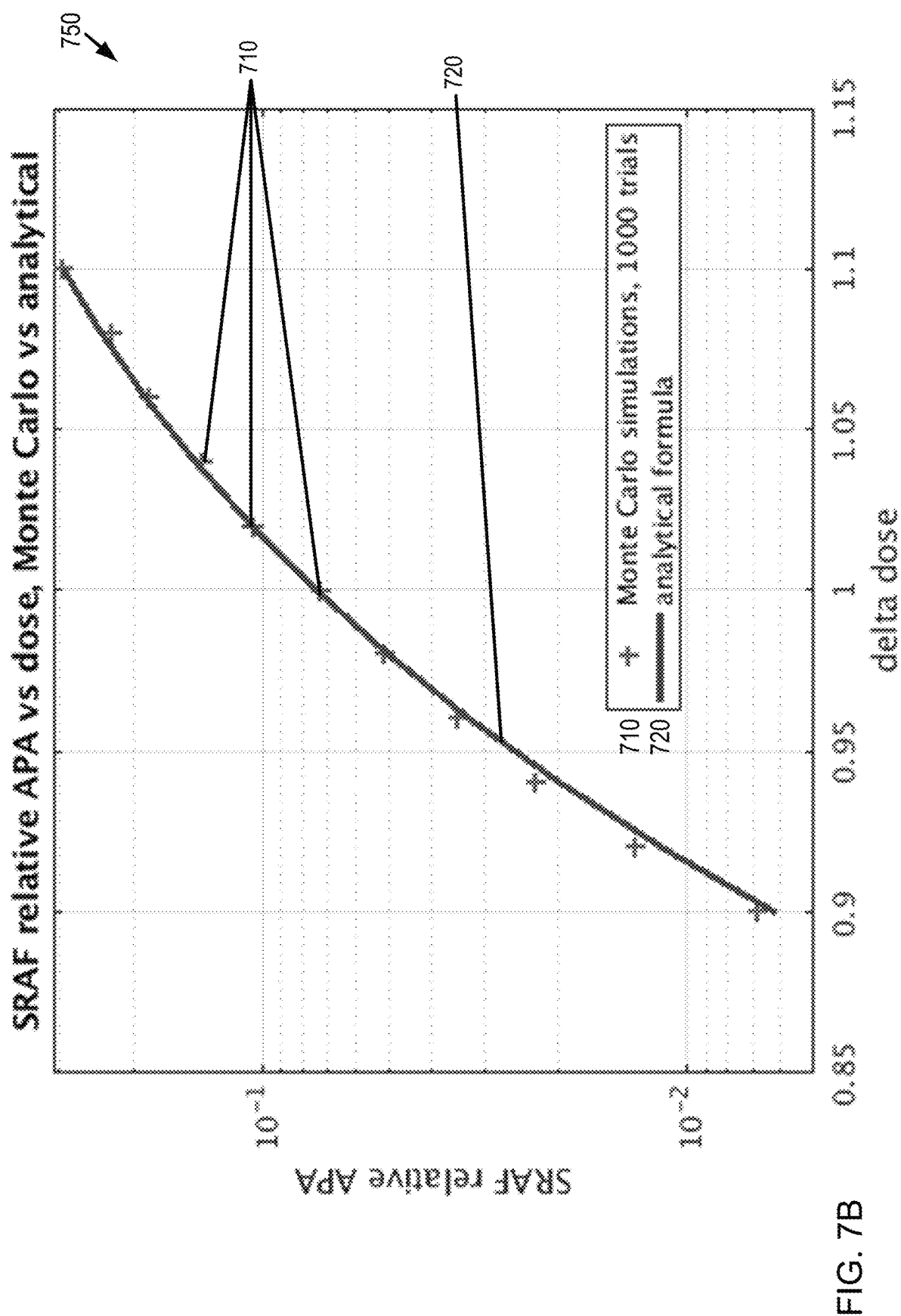
FIG. 7B is a graph of SRAF relative APA vs. dose for Monte Carlo and for analytical solutions (logarithmic scale) for the data illustrated in FIG. 6.

FIG. 7A is a graph 700 of SRAF relative APA vs. dose for Monte Carlo and for analytical solutions (linear scale) for the data illustrated in FIG. 6. FIG. 7B is a graph 750 of SRAF relative APA vs. dose for Monte Carlo and for analytical solutions (logarithmic scale) for the data illustrated in FIG. 6. As shown, the Monte Carlo simulation data points 710 follow the curve of the analytical formula 720.

Figure 8:
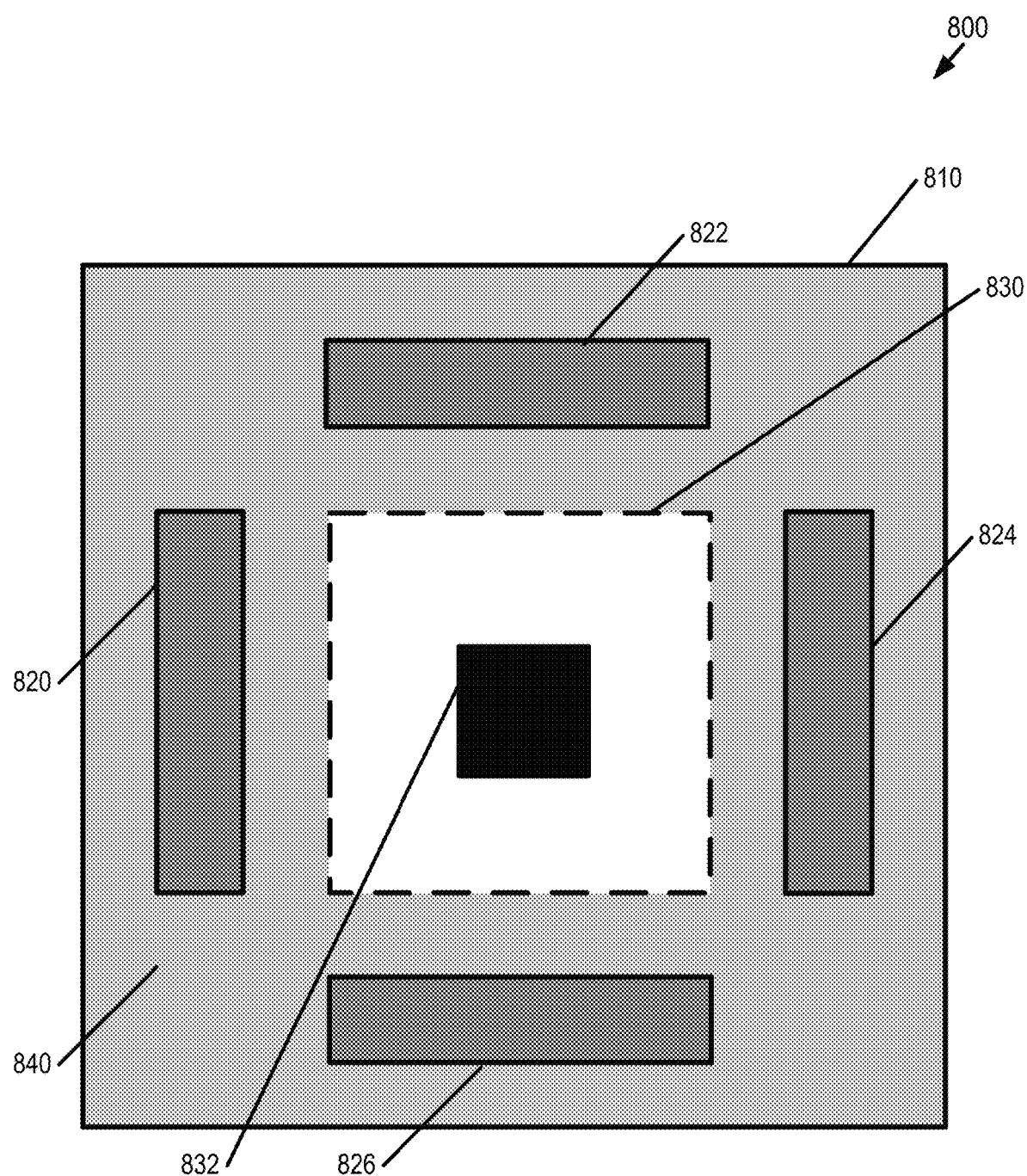
FIG. 8 is an illustration of the sidelobe printability control domain (SPCD) for a via/contact holes (CH) case.

FIG. 8 is an illustration 800 of the sidelobe printability control domain (SPCD) (defined by element 840 between box 810 and 830) for a via/contact holes (CH) case (shown as main feature 832). In the example of FIG. 8, the mask comprises: a darkfield mask; X/Y pitches 125 nm; main feature 832 is 27×27 nm on the mask printing to the X/Y CDs of 25 nm on the wafer; and SRAFs 820, 822, 824, 826 are 10×54 nm, positioned with their geometrical centers at a distance of 44 nm from the center of the main feature 832. The imaging and exposure comprises: a simplified imaging model (e.g., coherent illumination, Kirchhoff diffraction, EUV wavelength λ=13.5 nm, NA=0.33), nominal dose of 100 mJ/cm2). The resist and stochastic models comprise: diffusion_length=3 nm, resist efficiency=0.05. Further, the SRAF printability assessment comprises Sidelobe Printability Control Domain (SPCD) is the entire pitch, with the exception of the main feature 832 (e.g., 54×54 nm square centered at the center of the pitch). The exposure dose is varied within +/−10% of the nominal value in increments of 2%. Further, APA is calculated using 1e5 Monte Carlo trials and using the analytical APA metric, with the results from both calculations illustrated in the table 900 (with images of the SPCD 910 for different doses) in FIG. 9 showing SRAF-relative APA vs. dose derived from Monte Carlo simulations and from the analytical formula.

Figure 9:
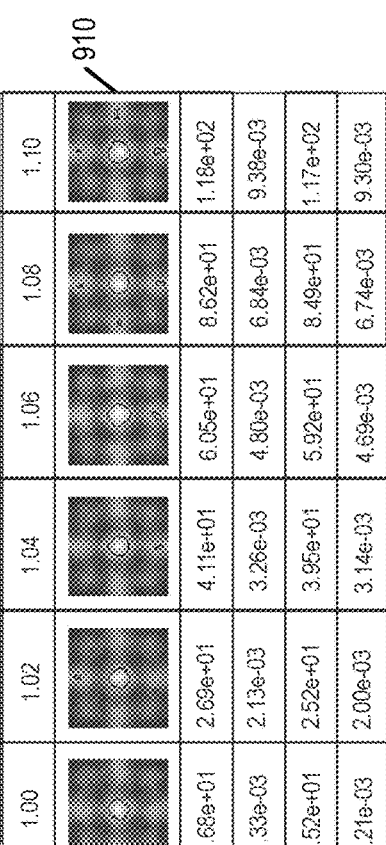
FIG. 9 is a table of SRAF-relative APA vs. dose derived from Monte Carlo simulations and from the analytical formula for the illustration in FIG. 8.
Figure 10A:
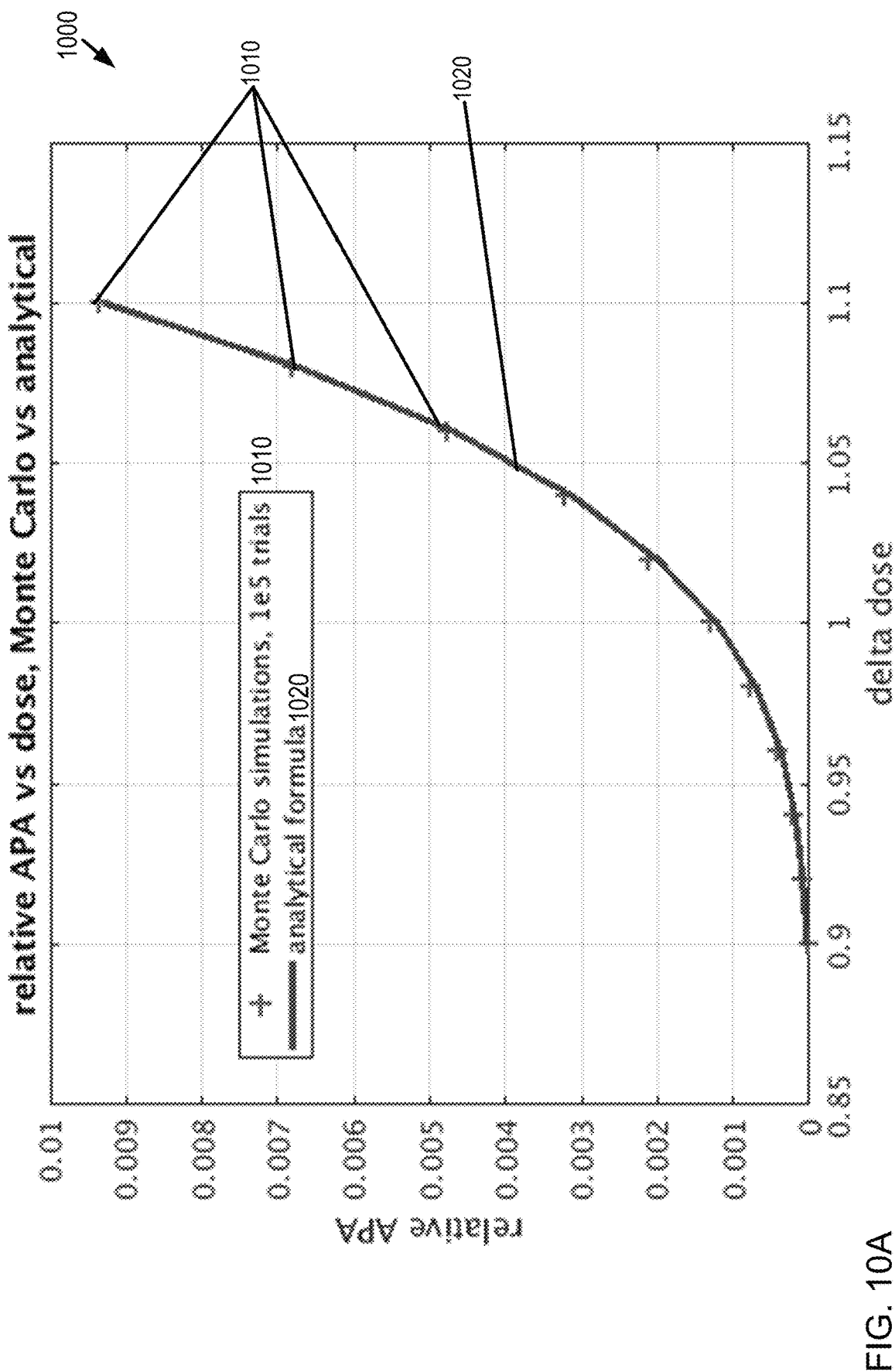
FIG. 10A is a graph of SRAF relative APA vs. dose for Monte Carlo and for analytical solutions (linear scale) for the data illustrated in FIG. 9.
Figure 10B:
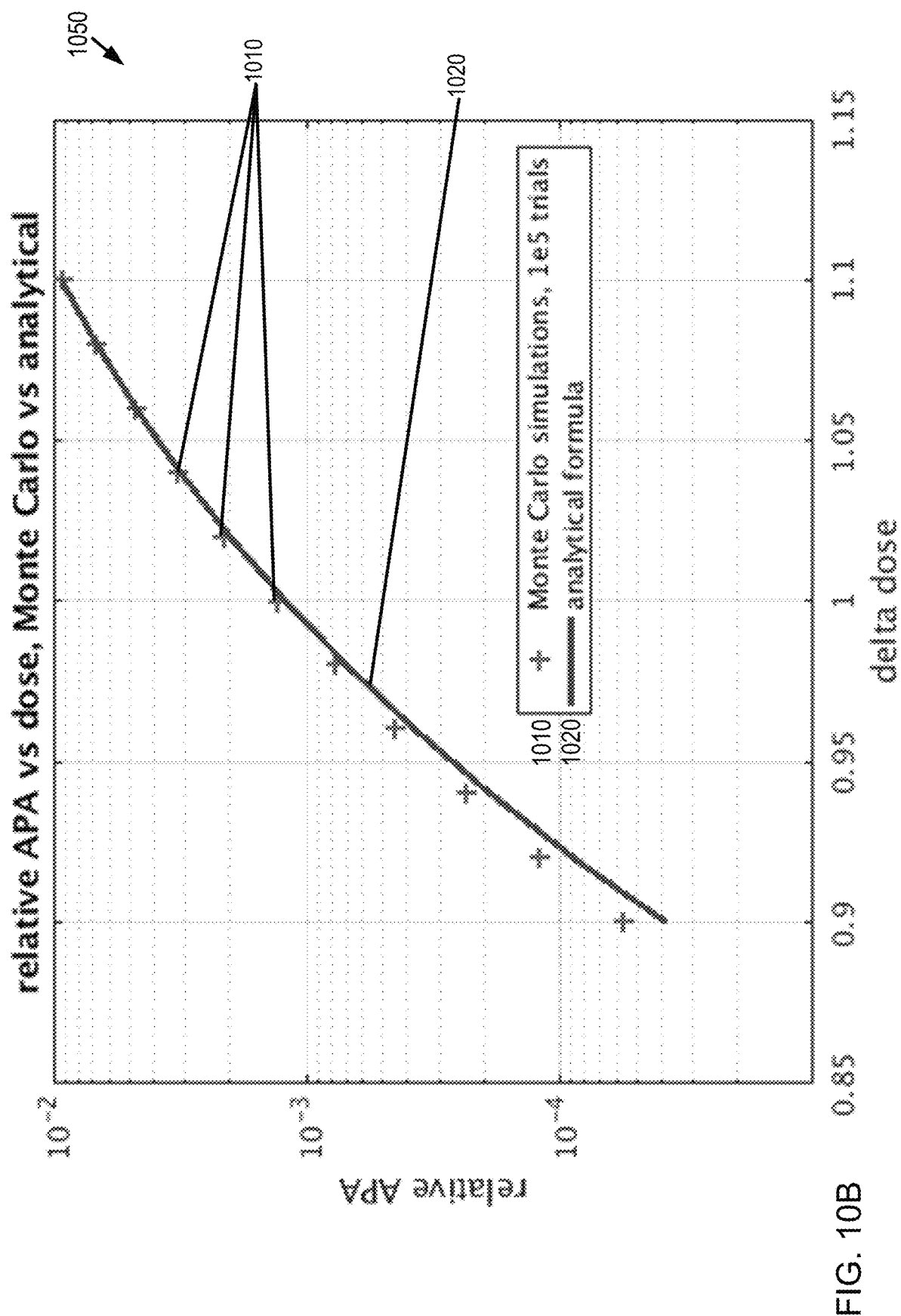
FIG. 10B is a graph of SRAF relative APA vs. dose for Monte Carlo and for analytical solutions (logarithmic scale) for the data illustrated in FIG. 9.

FIG. 10A is a graph 1000 of SRAF relative APA vs. dose for Monte Carlo and for analytical solutions (linear scale) for the data illustrated in FIG. 9. FIG. 10B is a graph 1050 of SRAF relative APA vs. dose for Monte Carlo and for analytical solutions (logarithmic scale) for the data illustrated in FIG. 9. As shown, the Monte Carlo simulation data points 1010 follow the curve of the analytical formula 1020.

As shown in FIGS. 7A-B and 10A-B, both LS and via/CH examples demonstrate a good agreement in SRAF APA prediction between the analytical APA metric and Monte Carlo derived APA. As discussed above, the stochastic model is based on Gaussian Random Field deprotection. Alternatively, the stochastic model may account for non-linearities in the real resist process (such as non-linearities to model saturation/depletion). In such an instance, the above analytical formulas for the printed area metrics likewise apply.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method comprising:
defining, by at least one processor of a computer, a printed area comprising a sidelobe printing control domain (SPCD) associated with a layout design, wherein the layout design includes one or more elements corresponding to one or more sub-resolution assist features (SRAFs) to remain unprinted during a lithographic process for imaging part or all of the layout design onto a substrate;
determining, by the at least one processor of the computer, one or more defined moments for a printed area distribution associated with the printed area, wherein the one or more defined moments are indicative of likelihood of printing within the printed area due to stochastic randomness in one or both of exposure or resist process; and
modifying, by the at least one processor of the computer, at least one aspect in the lithographic process based on the one or more defined moments for the printed area distribution associated with the printed area, which reduces an effect of the stochastic randomness in the lithographic process.

2. The method of claim 1, wherein a first moment for the printed area distribution associated with the printed area is determined; and
wherein the at least one aspect in the lithographic process is modified based on the first moment for the printed area distribution associated with the printed area.

3. The method of claim 2, wherein the printed area is defined based on the one or more elements in the layout design; and
wherein the first moment for the printed area distribution comprise an average printed area (APA) relating to printing due to the stochastic randomness of the one or more elements in the layout design that are not supposed to be printed.

4. The method of claim 3, wherein the printed area is defined as being between tips of two or more trenches; and
wherein the average printed area is indicative of pinching or bridging between the tips of the two or more trenches.

5. The method of claim 3, wherein the APA is calculated based, at least in part, on an integration of a cumulative distribution function (CDF) of a deprotection function of a resist image.

6. The method of claim 5, wherein the deprotection function of the resist image comprises a Gaussian Random Field such that the APA is calculated by:

$$APA = \frac{1}{2}\int_{SPCD}\left(1 - erf\left(\frac{t - \mu(x)}{\sigma(x)\sqrt{2}}\right)\right)dx$$

wherein erf(.) is a Gauss error function, t is a printability threshold of the resist model, μ(x) is a mean deprotection, and σ(x) is a standard deviation.

7. The method of claim 1, wherein a second moment for the printed area distribution associated with the printed area is determined; and
wherein the at least one aspect in the lithographic process is modified based on the second moment for the printed area distribution associated with the printed area.

8. The method of claim 7, wherein one or more elements in the layout design are supposed to be printed; and
wherein the second moment for the printed area distribution comprise a standard deviation printed area relating to variation in printing due to the stochastic randomness of the one or more elements in the layout design that are supposed to be printed.

9. The method of claim 8, wherein the one or more elements in the layout design that are supposed to be printed comprise vias/contact holes.

10. The method of claim 8, wherein the standard deviation printed area is a sqrt(Var(A)), where A is the printed area;
wherein the standard deviation printed area is calculated by:

$$Var(A) = E(A^2) - (E(A))^2$$

$$E(A^2) = \int_V \int_V (1 - F_{n(x_1),n(x_2)}(t, t))dx_1 dx_2$$

$$E(A) = APA = \left(\int_V (1 - F_{n(x)}(t))dx\right)$$

wherein V is a simulation domain, n(x) is a deprotection function of a resist image, t is a printability threshold of a resist model, E( ) is a statistical operator of expectation, and $F_{n(x_1),n(x_2)}(t, t)$ is a cumulative distribution function (CDF) of a bivariate random variable (n($x_1$), n($x_2$)), where the CDF is evaluated at a point (t, t), $F_{n(x)}(t)$ is a CDF of a univariate random variable n(x), and APA is an average printed area.

11. The method of claim 8, wherein the standard deviation printed area is a sqrt(Var(A)), where A is the printed area;
wherein the standard deviation printed area is calculated by:

$$Var(A)=E(A^2)-(E(A))^2$$

wherein integrations to calculate E($A^2$) and E(A) use a simulation domain.

12. The method of claim 11, wherein the CDF associated with the deprotection of the resist comprises a Gaussian Random Field deprotection function.

13. The method of claim 1, wherein determining one or more defined moments for a printed area distribution associated with the printed area is based on a cumulative distribution function (CDF) associated with deprotection of resist for the printed area.

14. A non-transitory machine-readable medium comprising instructions that, when executed by a processor, cause a computing system to perform a method comprising:
defining a printed area comprising a sidelobe printing control domain (SPCD) associated with a layout design that is used for a lithographic process for imaging part or all of the layout design onto a substrate, wherein the layout design includes one or more elements corresponding to one or more sub-resolution assist features (SRAFs) to remain unprinted during the lithographic process;
determining one or more defined moments for a printed area distribution associated with the printed area, wherein the one or more defined moments are indicative of likelihood of printing within the printed area due to stochastic randomness in one or both of exposure or resist process; and
modifying, based on the one or more defined moments for the printed area distribution associated with the printed area, at least one aspect in the lithographic process, which reduces an effect of the stochastic randomness in the lithographic process.

15. The non-transitory machine-readable medium of claim 14, wherein a first moment for the printed area distribution associated with the printed area is determined;
wherein the printed area is defined based on the one or more elements in the layout design; and
wherein the first moment for the printed area distribution comprise an average printed area (APA) relating to printing due to the stochastic randomness of the one or more elements in the layout design that are not supposed to be printed; and
wherein the at least one aspect in the lithographic process is modified based on the first moment for the printed area distribution associated with the printed area.

16. The non-transitory machine-readable medium of claim 15, wherein the printed area is defined as being between tips of two or more trenches; and
wherein the average printed area is indicative of pinching or bridging between the tips of the two or more trenches.

17. The non-transitory machine-readable medium of claim 15, wherein the APA is calculated based, at least in part, on an integration of a cumulative distribution function (CDF) of a deprotection function of a resist image.

18. The non-transitory machine-readable medium of claim 15, wherein a second moment for the printed area distribution associated with the printed area is determined; and
wherein one or more elements in the layout design are supposed to be printed;
wherein the second moment for the printed area distribution comprise a standard deviation printed area relating to variation in printing due to the stochastic randomness of the one or more elements in the layout design that are supposed to be printed; and
wherein the at least one aspect in the lithographic process is modified based on the second moment for the printed area distribution associated with the printed area.

19. The non-transitory machine-readable medium of claim 18, wherein the one or more elements in the layout design that are supposed to be printed comprise vias/contact holes.

20. The non-transitory machine-readable medium of claim 18, wherein the standard deviation printed area is a sqrt(Var(A)), where A is the printed area;
wherein the standard deviation printed area is calculated by:

$$\mathrm{Var}(A) = E(A^2) - (E(A))^2$$

$$E(A^2) = \int_V \int_V (1 - F_{(n(x_1),n(x_2))}(t, t)) dx_1 dx_2$$

$$E(A) = APA = \left( \int_V (1 - F_{n(x)}(t)) dx \right)$$

wherein V is a simulation domain, n(x) is a deprotection function of a resist image, t is a printability threshold of a resist model, E( ) is a statistical operator of expectation, and $F_{(n(x_1),n(x_2))}(t, t)$ is a cumulative distribution function (CDF) of a bivariate random variable $(n(x_1), n(x_2))$, where the CDF is evaluated at a point (t, t), $F_{n(x)}(t)$ is a CDF of a univariate random variable n(x), and APA is an average printed area.

21. The non-transitory machine-readable medium of claim 18, wherein the standard deviation printed area is a sqrt(Var(A)), where A is the printed area;
wherein the standard deviation printed area is calculated by:

$$\mathrm{Var}(A) = E(A^2) - (E(A))^2$$

wherein integrations to calculate $E(A^2)$ and $E(A)$ use a simulation domain.

* * * * *